US011365877B2

(12) United States Patent
Clark et al.

(10) Patent No.: US 11,365,877 B2
(45) Date of Patent: Jun. 21, 2022

(54) LENS ASSEMBLY FOR AN LED LIGHTING FIXTURE

(71) Applicant: Hubbell Lighting, Inc., Shelton, CT (US)

(72) Inventors: Adam J. Clark, Bradenton, FL (US); Perry Romano, Bradenton, FL (US)

(73) Assignee: Hubbell Lighting, Inc., Shelton, CT (US)

( * ) Notice: Subject to any disclaimer, the term of this patent is extended or adjusted under 35 U.S.C. 154(b) by 0 days.

(21) Appl. No.: 17/225,611

(22) Filed: Apr. 8, 2021

(65) Prior Publication Data

US 2021/0222864 A1 Jul. 22, 2021

Related U.S. Application Data

(63) Continuation of application No. 16/870,329, filed on May 8, 2020, now Pat. No. 10,976,045.

(60) Provisional application No. 62/845,979, filed on May 10, 2019.

(51) Int. Cl.
*F21V 31/00* (2006.01)
*F21V 5/00* (2018.01)
*F21V 17/00* (2006.01)
*G02B 1/04* (2006.01)
*F21S 8/00* (2006.01)
*F21Y 115/10* (2016.01)

(52) U.S. Cl.
CPC ............ *F21V 31/005* (2013.01); *F21V 5/007* (2013.01); *F21V 17/005* (2013.01); *G02B 1/04* (2013.01); *F21S 8/00* (2013.01); *F21Y 2115/10* (2016.08)

(58) Field of Classification Search
CPC ...... F21V 31/005; F21V 5/007; F21V 17/005; F21V 21/08; F21V 19/0055; F21V 17/12; F21V 17/10; F21V 31/00; F21V 15/00; G02B 1/04; F21Y 2115/10; F21S 8/00
See application file for complete search history.

(56) References Cited

U.S. PATENT DOCUMENTS

| 6,428,650 | B1 | 8/2002 | Chung |
| 7,081,644 | B2 | 7/2006 | Flaherty et al. |
| 8,794,802 | B2 | 8/2014 | Wu |
| D727,558 | S | 4/2015 | Tang |

(Continued)

FOREIGN PATENT DOCUMENTS

EP 2896877 7/2015

OTHER PUBLICATIONS

PCT/US2020/032099 International Search Report and Written Opinion dated Sep. 21, 2020.

*Primary Examiner* — Bao Q Truong
(74) *Attorney, Agent, or Firm* — Michael Best & Friedrich LLP

(57) ABSTRACT

A lighting fixture is provided. The lighting fixture may include one or more circuit boards having a plurality of LED light sources. The lighting fixture may further include one or more lens assemblies coupleable to the one or more circuit boards. The one or more lens assemblies may include a frame defining a plurality of openings. The one or more lens assemblies may further include a plurality of lenses molded to the frame. The plurality of lenses may be molded to the frame such that each of the plurality of lenses is at least partially positioned within a corresponding opening of the plurality of openings defined by the frame.

5 Claims, 11 Drawing Sheets

(56) References Cited

U.S. PATENT DOCUMENTS

| | | | |
|---|---|---|---|
| 9,222,654 B2 * | 12/2015 | Boyer | F21V 17/18 |
| 9,274,343 B2 | 3/2016 | Meinherz | |
| 9,316,387 B1 * | 4/2016 | Olsson | F21V 31/005 |
| 10,559,722 B2 | 2/2020 | Omori | |
| 10,704,765 B2 | 7/2020 | Shellhause | |
| 10,976,045 B2 * | 4/2021 | Clark | G02B 1/041 |
| 2008/0273327 A1 | 11/2008 | Wilcox et al. | |
| 2012/0188766 A1 * | 7/2012 | Lu | F21V 29/763 |
| | | | 362/249.02 |
| 2015/0300624 A1 | 10/2015 | Favarolo | |
| 2016/0047528 A1 | 2/2016 | Goldstein et al. | |
| 2016/0215955 A1 | 7/2016 | Schreder | |
| 2017/0184288 A1 | 6/2017 | Owens | |
| 2017/0215256 A1 | 7/2017 | Abbatista | |
| 2019/0113183 A1 | 4/2019 | Levy | |

* cited by examiner

LENS ASSEMBLY FOR AN LED LIGHTING FIXTURE

RELATED APPLICATIONS

The present application is a continuation of U.S. application Ser. No. 16/870,329, filed May 8, 2020, which claims the benefit of priority of U.S. Provisional Patent Application Ser. No. 62/845,979, filed May 10, 2019, the entire contents of which are hereby incorporated by reference.

FIELD

The present disclosure relates generally to a lens assembly for LED lighting fixtures.

BACKGROUND

Lighting fixtures e.g., luminaires) using light emitting diodes (LEDs) have in recent years become somewhat practical and continue to penetrate the lighting market due to the increased luminous efficacy of commercially available LED components. LED lighting fixtures are desirable as they offer customers energy savings due to good luminous efficacy combined with the ability to precisely control light distribution patterns, which is of particular importance for certain lighting scenarios, such as outdoor environments, and open environments, such as parking garages and canopies.

SUMMARY

Lighting fixtures described herein include one or more circuit boards. The one or more circuit boards may include a plurality of LED light sources. The lighting fixture may further include one or more lens assemblies coupleable to the circuit board. The one or more lens assemblies may include a frame defining a plurality of openings. The one or more lens assemblies may further include a plurality of lenses molded to the frame. The plurality of lenses may be molded to the frame such that each of the plurality of lenses is at least partially positioned within a corresponding opening of the plurality of openings defined by the frame.

Lens assemblies described herein are coupled to a circuit board including a plurality of light emitting diode (LED) light sources. The lens assembly may include a frame defining a plurality of openings, a plurality of lenses molded to the frame such that each of the plurality of lenses is at least partially positioned within a corresponding opening of the plurality of openings defined by the frame. When the lens assembly is coupled to the circuit board, each of the plurality of lenses is in optical communication with a corresponding LED light source of the plurality of LED light sources.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification may include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed. As used herein, a "lighting fixture" refers to a device used to provide light or illumination using one or more light sources.

Other aspects of the invention will become apparent by consideration of the detailed description and accompanying drawings.

DETAILED DESCRIPTION

Figure 1:
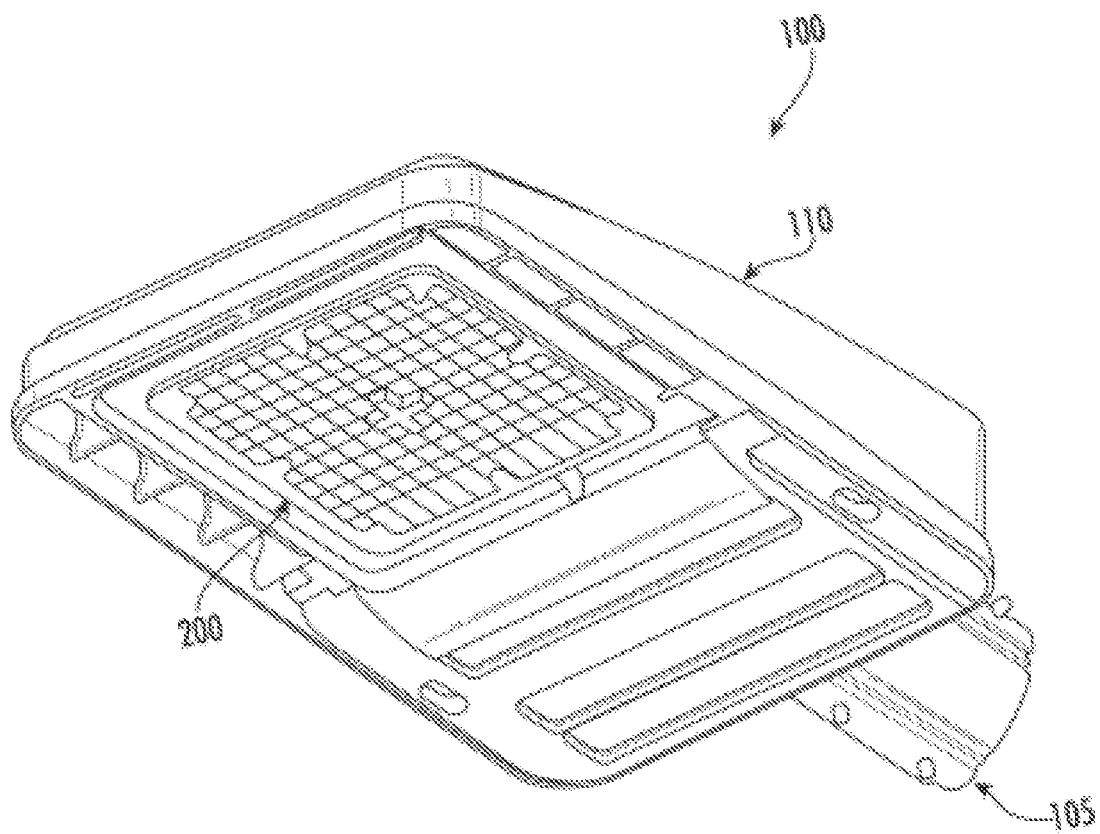
FIG. 1 is a perspective view of a lighting fixture, according to embodiments described herein.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

Embodiments of the present disclosure are directed to a lens assembly for a lighting fixture. The lens assembly may include a frame defining a plurality of openings. In some embodiments, the frame includes a first group of walls and a second group of walls. The first group of walls may intersect the second group of walls. In this manner, the plurality of openings is defined by one or more walls included in the first group of walls and one or more walls included in the second group of walls.

The lens assembly may further include a plurality of lenses molded to the frame. The plurality of lenses may be molded to the frame such that each of the plurality of lenses is at least partially positioned with a corresponding opening of the plurality of openings. In some embodiments, the plurality of lenses may be formed from silicone rubber. In addition, the frame may be formed from a polycarbonate material. In this manner, the frame may withstand the process (e.g., temperatures) of molding the plurality of lenses to the frame. As will be discussed below, the lens assembly may be coupled to a circuit board (e.g., including a plurality of LED light sources) of the lighting fixture.

In some embodiments, the circuit board may be positioned on a surface associated with the lighting fixture. For instance, the surface may be associated with a housing configured to accommodate one or more electrical components (e.g., LED drivers) of the lighting fixture. The circuit board may define a plurality of mounting holes and may be positioned such that each of the plurality of mounting holes is aligned with a corresponding mounting hole defined by the surface. As will be discussed below in more detail, the lens assembly may be coupled to the circuit board such that the circuit board is positioned between surface and the lens assembly.

In some embodiments, the frame of the lens assembly may include a plurality of mounting flanges. Furthermore, each of the plurality of mounting flanges may define a mounting hole. In such embodiments, the lens assembly may be positioned such that the mounting hole defined by each of the plurality of mounting flanges is aligned with a corresponding mounting hole defined by the circuit board. In this manner, the lens assembly may be coupled to the circuit board via a plurality of fasteners. For instance, each of the plurality of fasteners may extend through the mounting hole defined by a corresponding mounting flange of the plurality of mounting flanges. Each of the plurality of fasteners may further extend through a corresponding mounting hole of the plurality of mounting holes defined by the circuit board and surface, respectively.

When the lens assembly is coupled to the circuit board, each of the plurality of lenses may be in optical communication with a corresponding LED light source of the plurality of LED light sources on the circuit board. In this manner, light emitted from the plurality of LED light sources may pass through the plurality of lenses. In some embodiments, the frame may be configured to diffuse light emitted from the plurality of LED light sources. For example, the frame may have a reflective finish such that light emitted onto the frame is reflected. As another example, the frame be formed, at least in part, from a translucent material. Alternatively or additionally, a surface of the frame may be matte or textured.

In some embodiments, the lens assembly may include a gasket molded to a bottom surface of an outer portion of the frame. In this manner, the gasket may seal against the surface to provide a seal between the circuit board and an external environment surrounding the housing of the lighting fixture. For example, if the lighting fixture is an outdoor lighting fixture, the seal may protect the circuit board from moisture damage and insects. In some embodiments, the gasket may be a wiper gasket to limit a compressive force the gasket applies on the outer portion of the frame when the frame is coupled to the circuit board.

In some embodiments, the outer portion of the frame may be heavier compared to the inner portion of the frame to resist deflection due, at least in part, to an upward force the gasket applies on the outer portion of the frame. Deflection due to the upward force may cause the lens assembly to shift relative the circuit board. When the lens assembly shifts relative to the circuit board, the plurality of lenses may become separated from a corresponding LED light source on the circuit board, which may reduce or degrade the light output of the lighting fixture. Accordingly, the outer portion of the frame may, as discussed above, be heavier than the inner portion of the frame to resist such deflection and, as a result, maintain proper alignment of the lens assembly relative to the circuit board.

It should be understood that multiple lens assemblies may be used in lighting fixtures having more than one circuit board and/or having a plurality of LED light sources. It should also be understood that more than one lens assembly may be used on the same circuit board. For instance, in some embodiments, two or more lens assemblies may be used on the same circuit board. More specifically, a first lens assembly may be positioned such that the plurality of lenses of the first lens assembly are aligned with a corresponding LED light source of a plurality of LED light sources included on a first portion of the circuit board. Additionally, a second lens assembly may be positioned on the same circuit board such that the plurality of lenses of the second lens assembly are aligned with a corresponding LED light source of a plurality of LED light sources included on a second portion of the circuit board that is different than the first portion.

It should also be understood that, in some embodiments, a lens assembly may be coupled to more than one circuit board. For instance, the lens assembly may be coupled to a first circuit board and a second circuit board. In this manner, the plurality of lenses of the lens assembly may be segmented into a first plurality of lenses and a second plurality of lenses. Each lens included in the first plurality of lenses may be in optical communication with a corresponding LED light source on the first circuit board. Conversely, each lens included in the second plurality of lenses may be in optical communication with a corresponding LED light source on the second circuit board.

In some embodiments, the lens assemblies may be rotatable relative to the circuit board to direct light emitted from the LED array in any suitable direction. In some embodiments, rotation of the lens assemblies in one or more directions may be limited to approximately 90 degrees.

Lens assemblies according to embodiments of the present disclosure provide numerous technical effects and benefits. For instance, molding the plurality of lenses onto a frame provides an improvement over individually manufacturing the plurality of lenses for the circuit board. Furthermore, molding the gasket to the frame reduces the number of components of the lens assembly. In addition, a cross-sectional area of the gasket may be reduced compared to a cross-sectional area of the standalone gasket, because molding the gasket to the frame reduces or eliminates a need for the gasket to be self-supporting. In this manner, the number of LED light sources on the LED array may be increased since the size of the gasket may be reduced.

Figure 2:
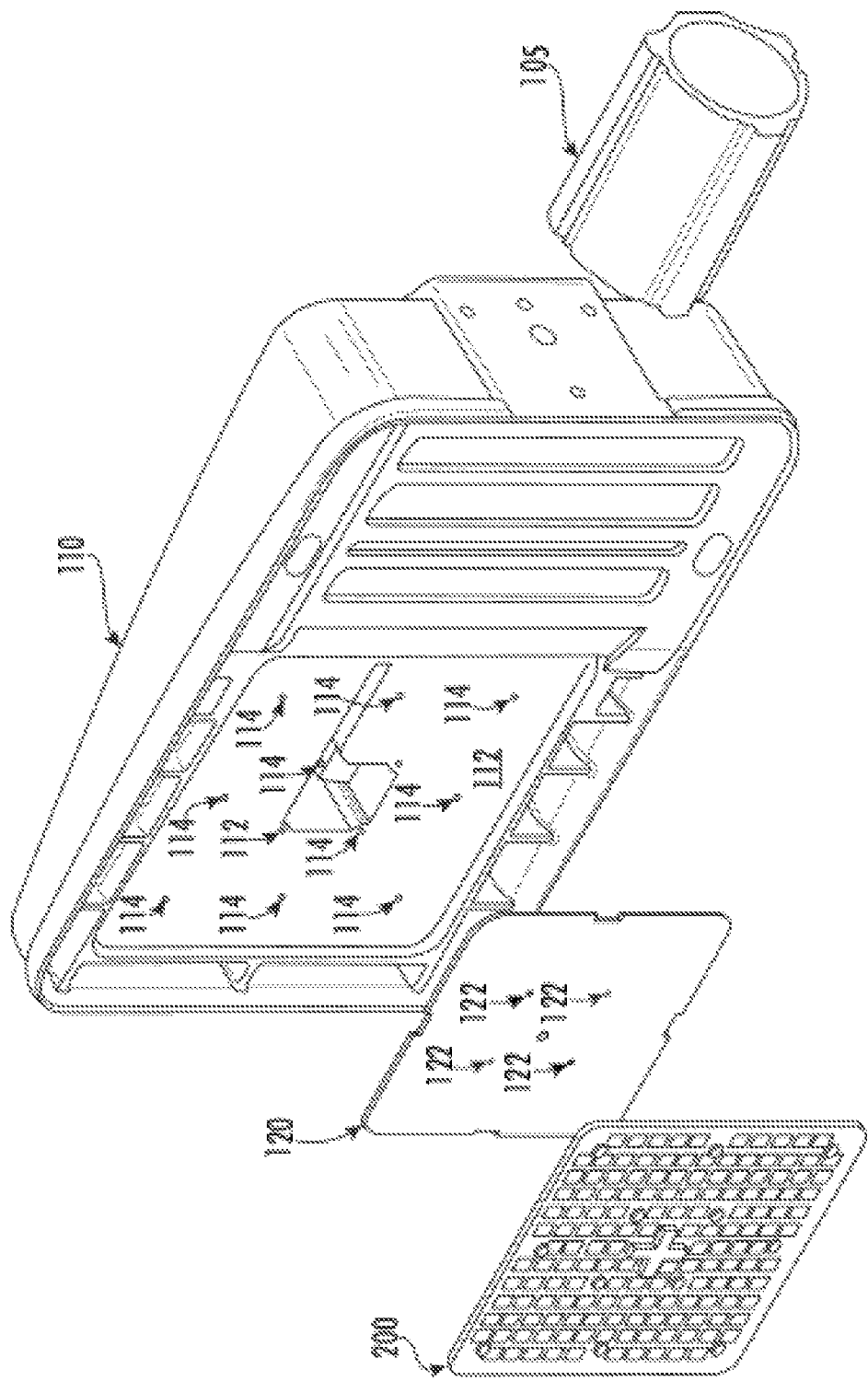
FIG. 2 is an exploded view of an LED system of the lighting fixture of FIG. 1, according to embodiments described herein.

FIGS. 1 and 2 illustrate a lighting fixture 100 according to some exemplary embodiments. Lighting fixture 100 may be, for example, an area or flood lighting fixture configured to provide lighting for a space, such as an athletic field, a stadium, or any other suitable outdoor environment. The lighting fixture 100 may be mounted to a pole, wall, or other structure using a plurality of mounting options. For instance, as shown, the lighting fixture 100 may include a slip fitter 105 for mounting. Alternatively, the lighting fixture 100 may be mounted, for instance, using a pole, wall, vertical tenon, or traditional arm mount. Mounting options may also include, without limitation, use of a wall bracket, adjustable knuckle, or a rectangular arm, The lighting fixture 100 may include a housing 110 configured to contain and/or cover various components of the lighting fixture 100, such as one or more LED drivers. In some embodiments, the housing 110 may be a plastic shell that covers internal components of the lighting fixture 100. It should be appreciated that the housing 110 may be made from any suitable type of material. For instance, in some embodiments, the housing 110 may be made from plastic, aluminum, die cast aluminum, stainless steel, galvanized steel, powder coated steel, or any other suitable type of material.

In some embodiments, the lighting fixture 100 includes a circuit board 120. The circuit board 120 may include a plurality of LED light sources. It should be understood that each of the plurality of LED light sources may be any suitable size, color, color temperature, etc. to accommodate a desired light application. For instance, the plurality of LED light sources may have a color temperature of 3000K, 4000K, 5000K or other suitable color temperature. Embodiments of the present disclosure are discussed with LED light sources for purposes of illustration and discussion. However, those of ordinary skill in the art, using the disclosures provided herein, will understand that other suitable light sources (e.g., other solid state light sources, etc.) may be used without deviating from the scope of the present disclosure. Furthermore, it should be understood that the circuit board 120 may, in some embodiments, be a metal clad printed circuit board 120.

Figure 3:
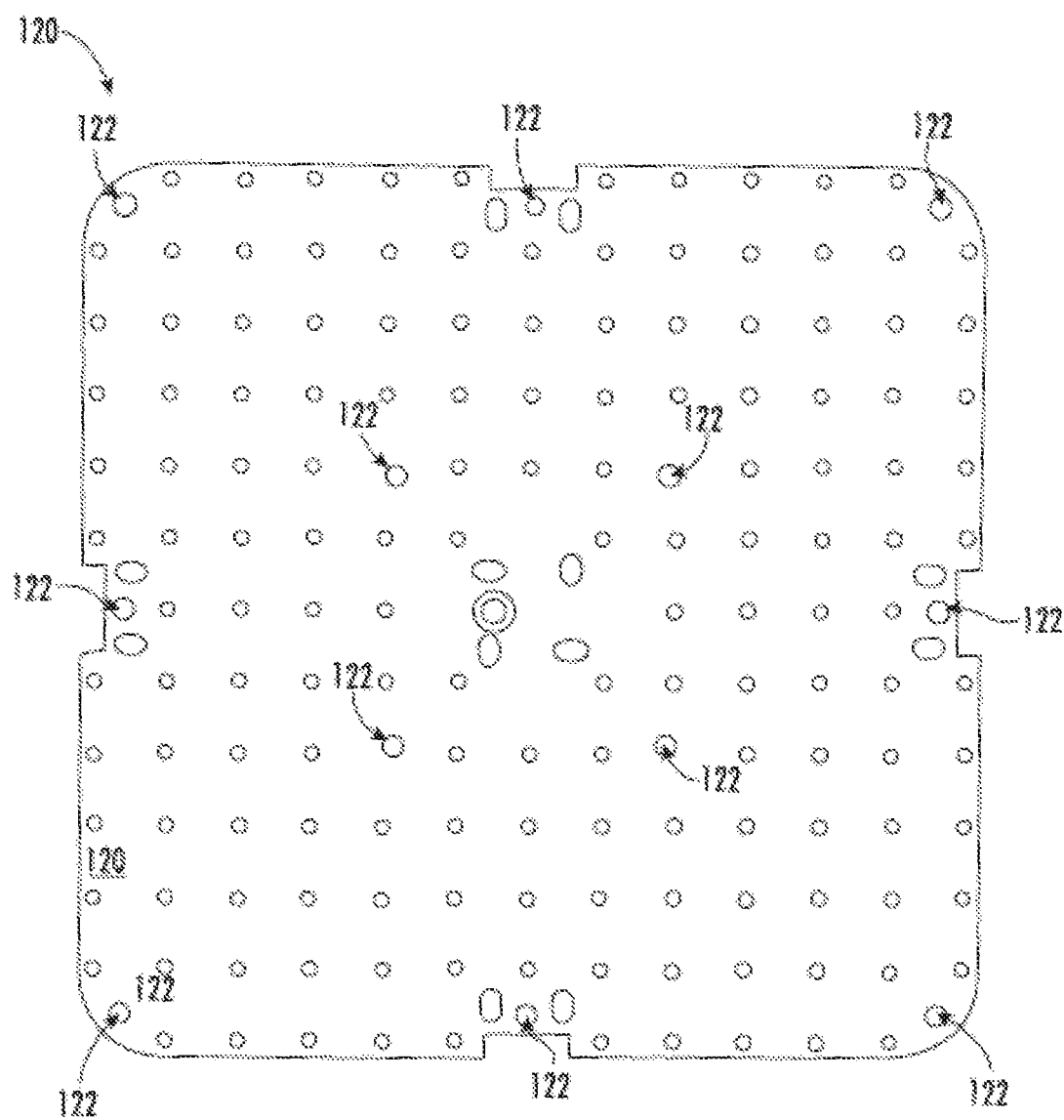
FIG. 3 illustrates a circuit board of a lighting fixture, according to embodiments described herein.

With reference to FIGS. 2 and 3, the circuit board 120 may be positioned on a surface 112 of the housing 110. More specifically, the circuit board 120 may be positioned on the surface 112 such that each of a plurality of mounting holes 122 defined by the circuit board 120 is aligned with a corresponding mounting hole of a plurality of mounting holes 114 defined by the surface 112. It should be appreciated, however, that the circuit board 120 may be positioned on any suitable surface associated with the lighting fixture 100.

The lighting fixture 100 may include a lens assembly 200. In some embodiments, the lens assembly 200 may be coupled to the circuit board 120 such that the circuit board 120 is positioned between the lens assembly 200 and the surface 112 of the housing 110. Construction of the lens assembly 200 will be discussed below in more detail with reference to FIGS. 3-6. It should be understood, however, that the lens assembly 200 according to exemplary embodiments of the present disclosure may be used in conjunction with any suitable lighting fixture or light source without deviating from the scope of the present disclosure.

Figure 4:
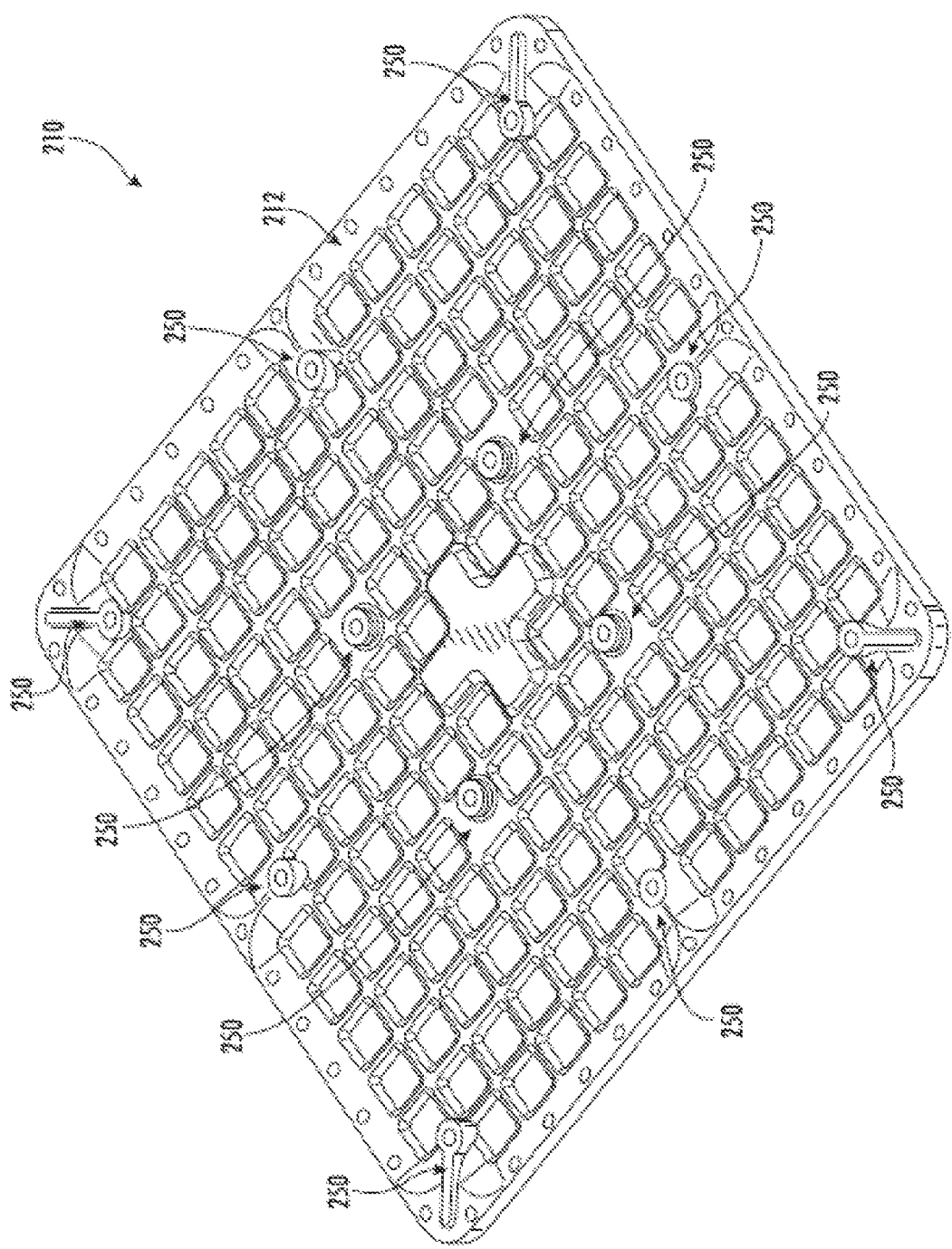
FIG. 4 is a perspective view of a frame of a lens assembly, according to embodiments described herein.
Figure 5:
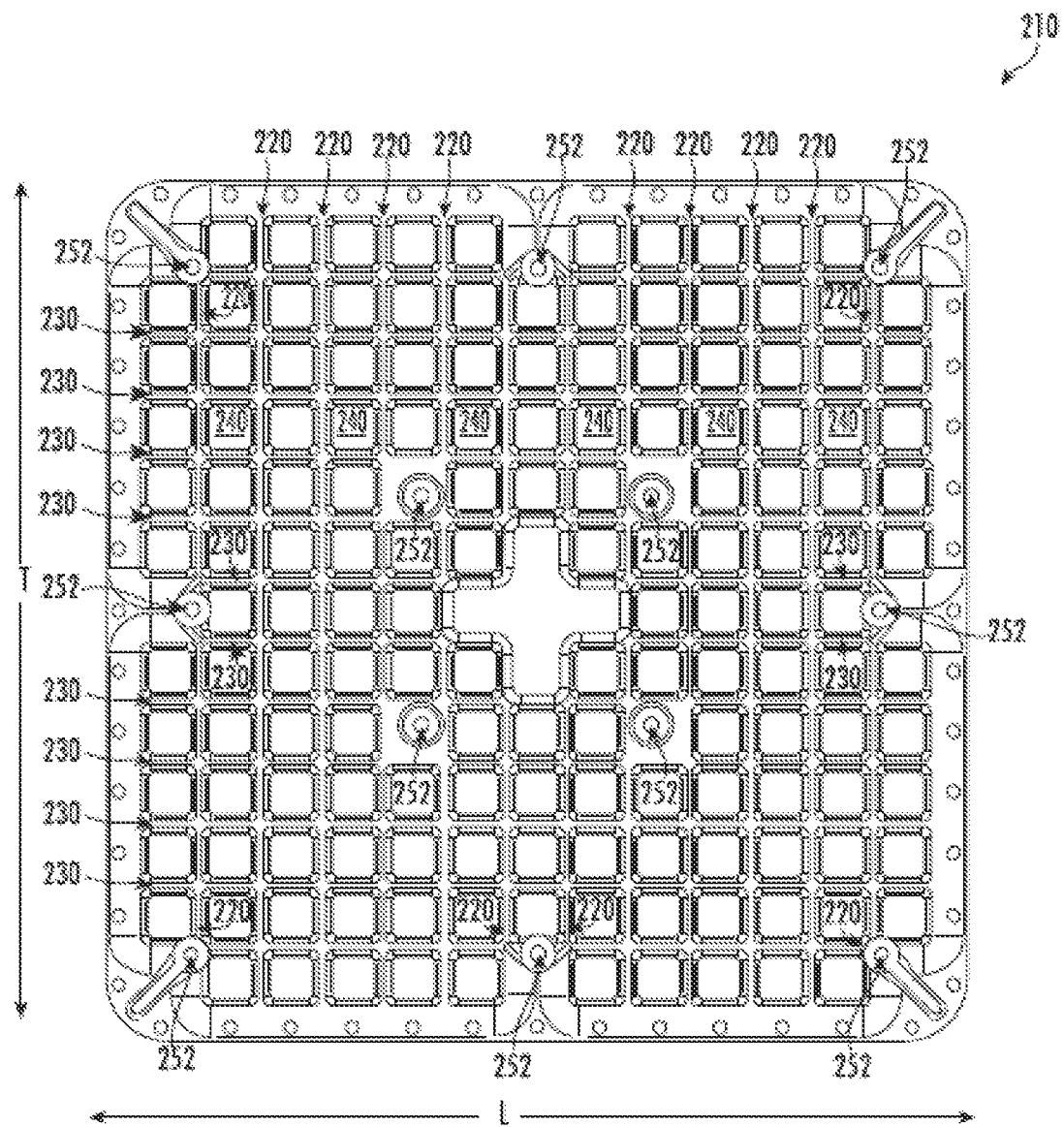
FIG. 5 is a top view of a frame of a lens assembly, according to some embodiments described herein.

With reference to FIGS. 4 and 5, the lens assembly 200 may include a frame 210. As shown, the frame 210 may define a coordinate system that includes a lateral direction L and a transverse direction T that is substantially orthogonal to the lateral direction L. In some embodiments, the frame 210 includes a first group of walls 220 extending along the transverse direction T and spaced apart from one another along the lateral direction L. Additionally, the frame 210 may include a second group of walls 230 extending along the lateral direction L and spaced apart from one another along the transverse direction T. As shown, the first plurality of walls 220 may intersect the second plurality of walls 230. In this manner, the frame 210 may be configured as a grate having a plurality of openings 240. It should be understood, however, that the frame 210 may be configured to have any suitable shape. For instance, in some embodiments, the frame 210 may be configured as a grate having a non-rectangular shape. More specifically, the frame 210 may be configured as a grate having a hexagonal shape or any other suitable non-rectangular shape.

In some embodiments, the frame 210 may include a plurality of mounting flanges 250. As shown, each of the plurality of mounting flanges 250 may define a mounting hole 252. It should be understood that the plurality of mounting flanges 250 may include any suitable structure defining a mounting hole. For instance, in some embodiments, one or more of the mounting flanges 250 may be a mounting boss having any suitable size or shape.

In some embodiments, the plurality of mounting flanges 250 may, as shown, include a first group of mounting flanges and a second group of mounting flanges. The first group of mounting flanges may be positioned along an outer portion of the frame 210. The second group of mounting flanges may be positioned at an inner portion of the frame 210. It should be appreciated, however, that the mounting flanges 250 may be positioned at any suitable location on the frame 210.

Figure 6:
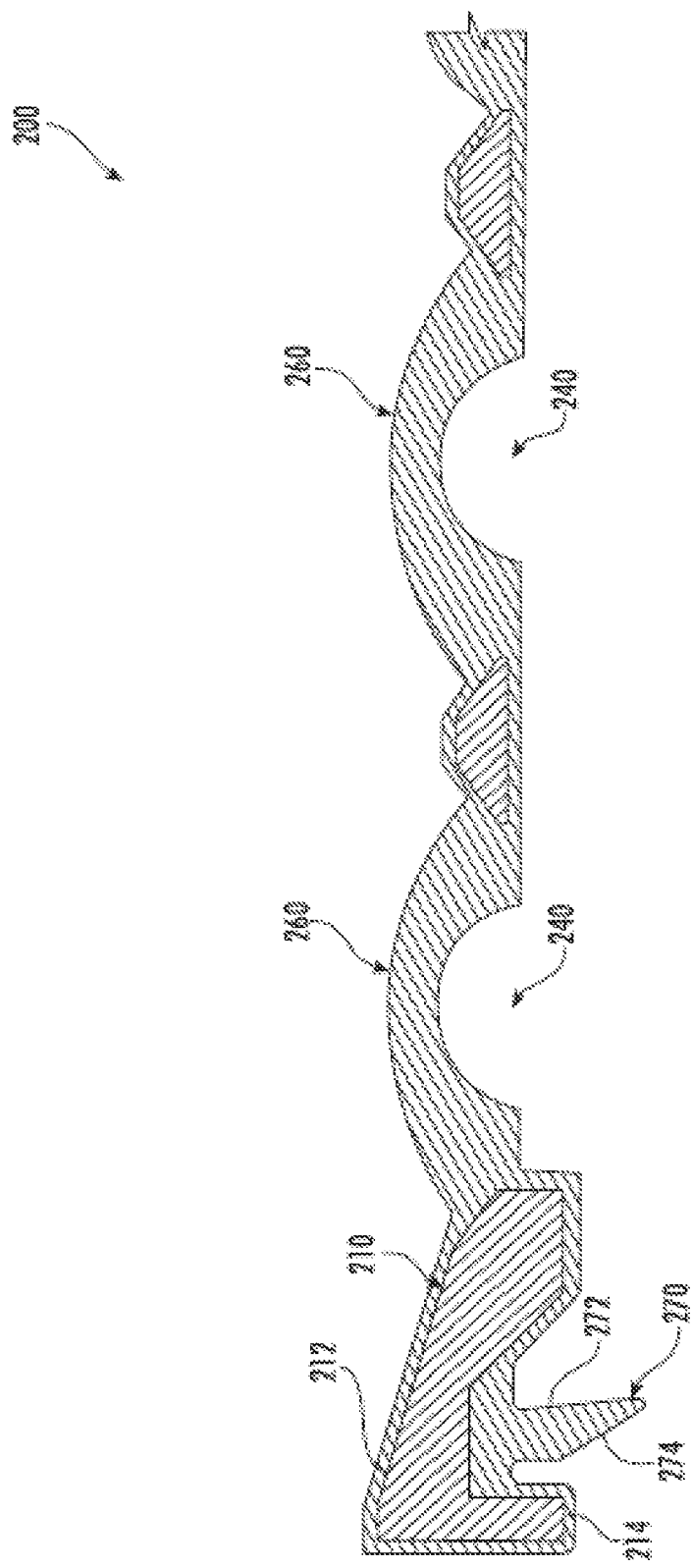
FIG. 6 is a cross-sectional view of a portion of a lens assembly, according to some embodiments described herein.
Figure 7:
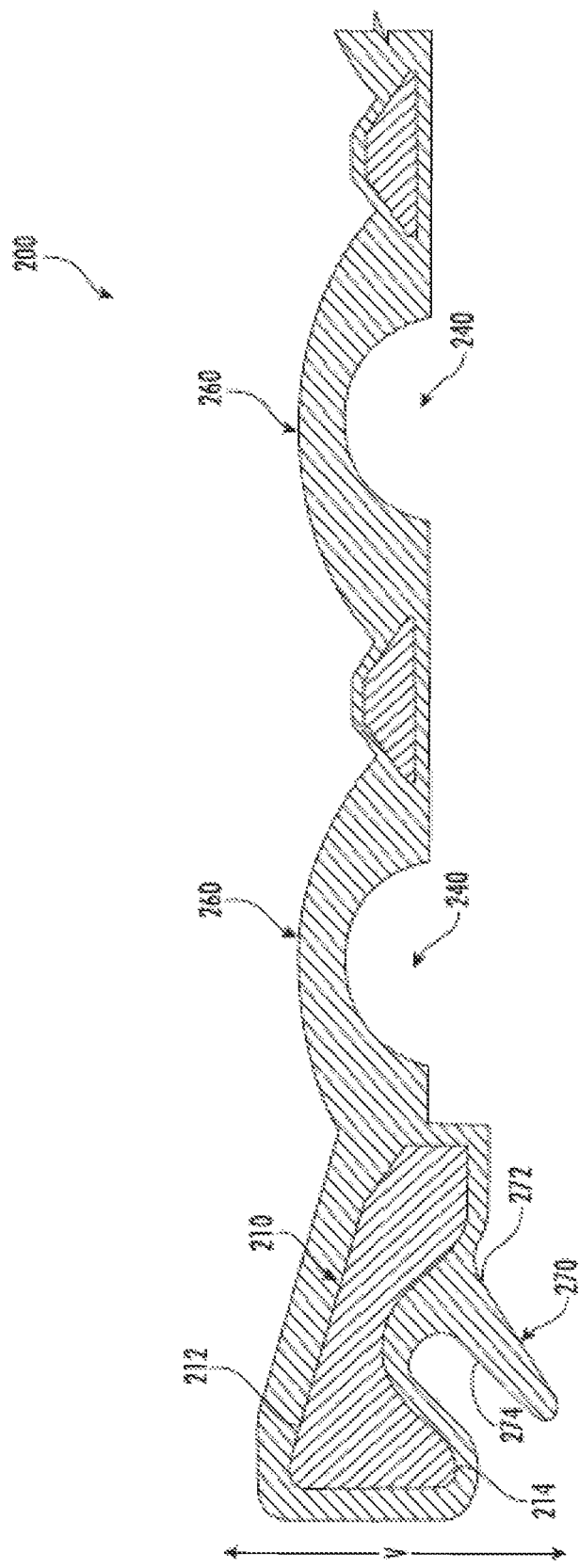
FIG. 7 is a cross-sectional view of a portion of a lens assembly, according to some embodiments described herein.
Figure 8:
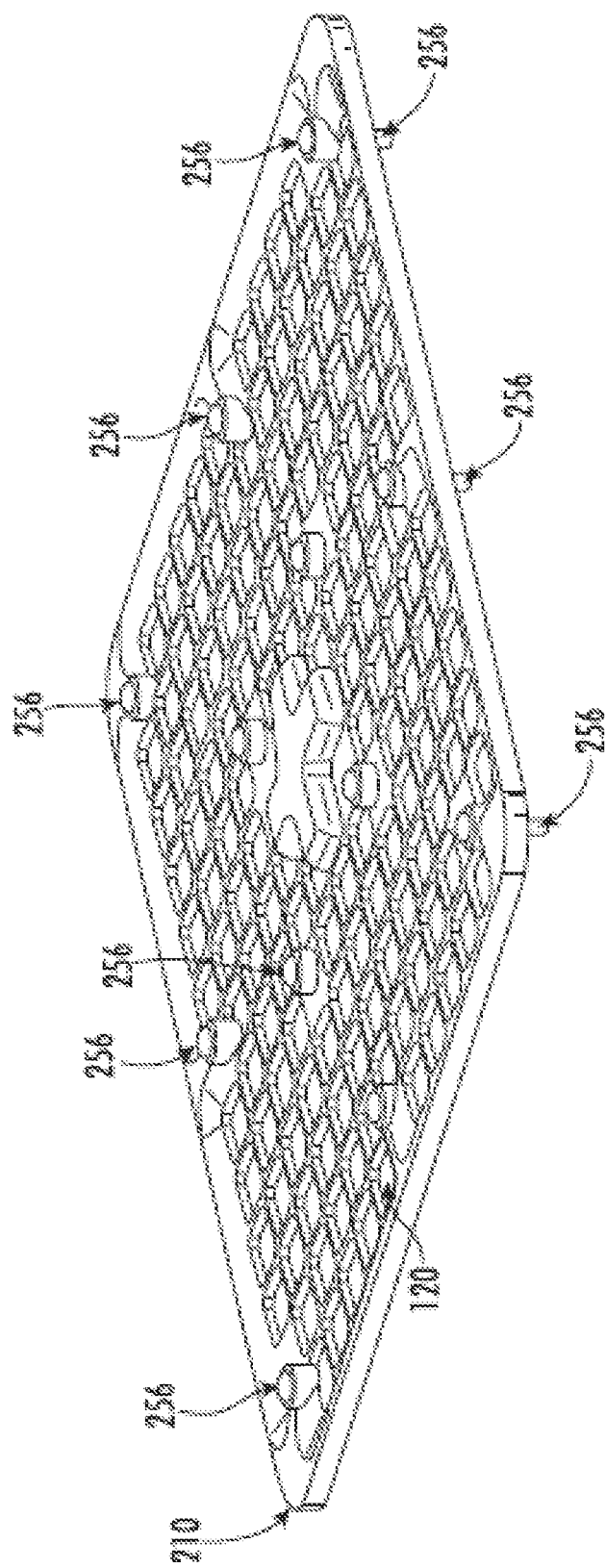
FIG. 8 is a perspective view of a lens assembly secured to a circuit board of a lighting fixture, according to some embodiments described herein.
Figure 9:
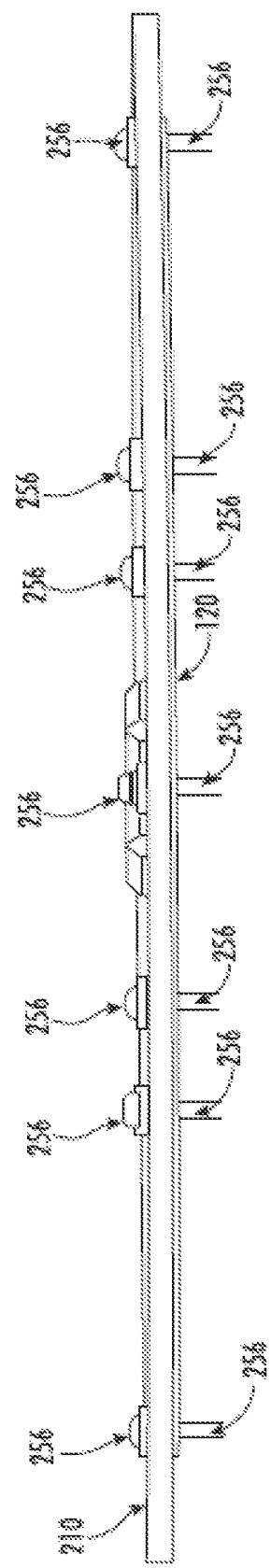
FIG. 9 is a side view of a lens assembly secured to a circuit board of a lighting fixture, according to some embodiments described herein.
Figure 10:
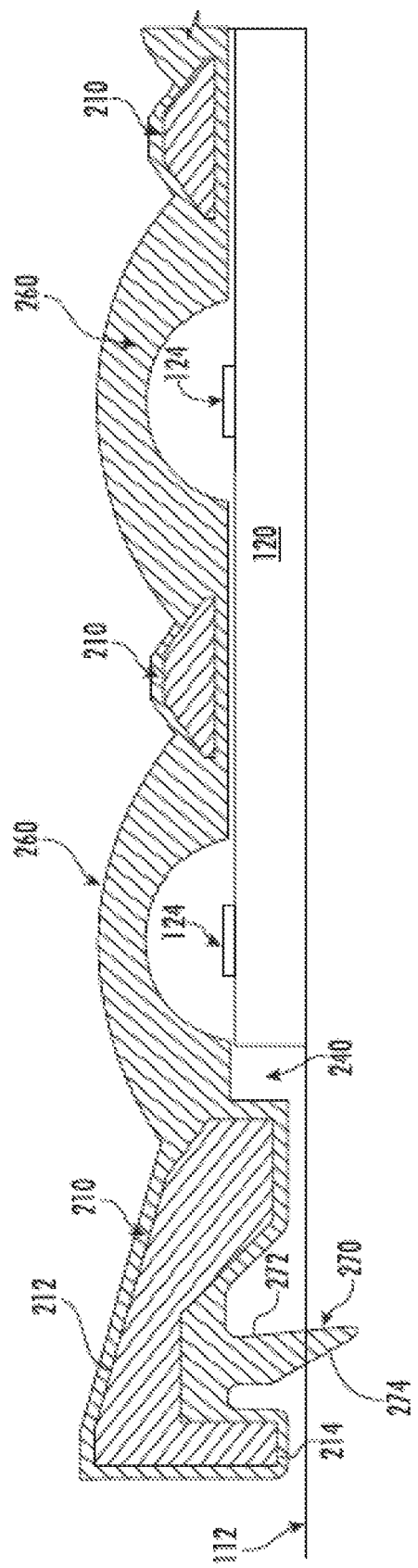
FIG. 10 is a cross-sectional view of the portion of the lens assembly of FIG. 6 mounted to a surface associated with a lighting fixture, according to some embodiments described herein.
Figure 11:
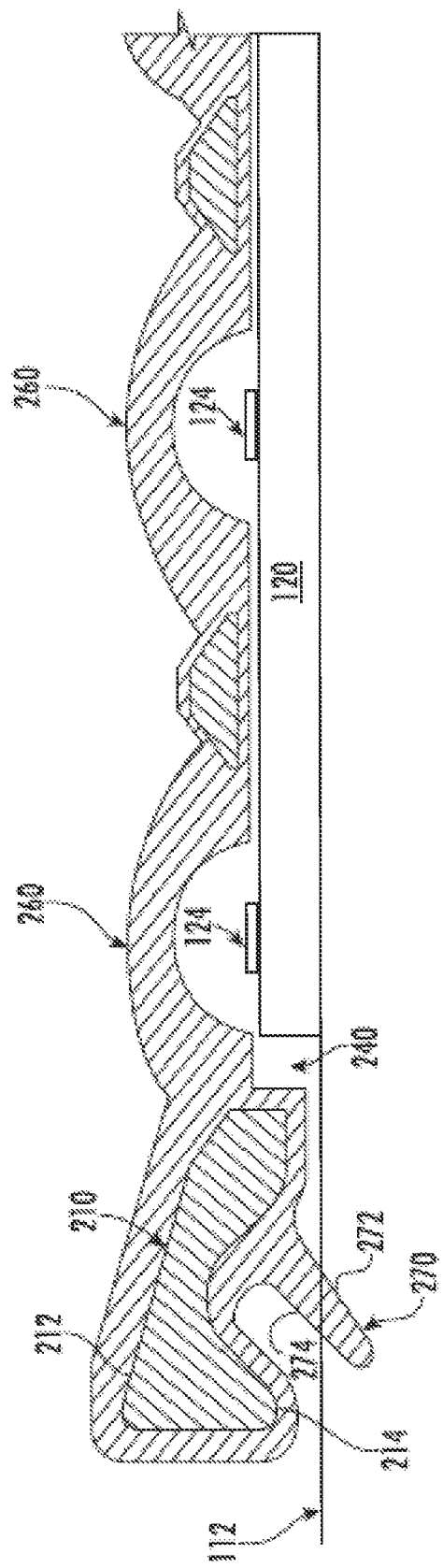
FIG. 11 is a cross-sectional view of the portion of the lens assembly of FIG. 7 mounted to a surface associated with a lighting fixture, according to some embodiments described herein.

With reference to FIGS. 6 and 7, the lens assembly 200 may include a plurality of lenses 260 molded to the frame 210. More specifically, the plurality of lenses 260 may be molded to the frame 210 such that each of the plurality of lenses 260 is positioned within a corresponding opening of the plurality of openings 240 defined by the frame 210. In some embodiments, the plurality of lenses 260 are molded, at least in part, to a top surface 212 of the frame 210. It should be appreciated that the plurality of lenses 260 may be formed from any type of material suitable for use as an optic. For instance, in some embodiments, the plurality of lenses 260 may be formed from silicone. More specifically, the plurality of lenses 260 may be formed from a silicone rubber. It should also be appreciated that the frame 210 may be formed from any suitable type of material configured to endure the process of molding the plurality of lenses 260 to the frame 210. For instance, in some embodiments the frame 210 may be formed from a polycarbonate material.

In some embodiments, the lens assembly 200 may include a gasket 270 molded to the frame 210. For instance, the gasket 270 may be molded to a bottom surface 214 of an outer portion of the frame 210. As shown, the gasket 270 may include an inner surface 272 and an outer surface 274. In some embodiments, the gasket 270 is tapered along the vertical direction V. In alternative embodiments, the gasket 270 projects from the frame 210 at an angle.

It should be appreciated that the gasket 270 may include any suitable type of gasket. For instance, in some embodiments, the gasket 270 may be a wiper gasket. It should also be appreciated that the gasket 270 may be formed from any suitable type of material. For instance, in some embodiments, the gasket 270 may be formed from silicone rubber. As will be discussed below in more detail, the gasket 270 may seal against a surface to which the lens assembly 200 is mounted.

With reference to FIGS. 8-11, the lens assembly 200 may be positioned such that the mounting hole 252 (FIG. 5) defined by each of the plurality of mounting flanges 250 (FIG. 4) is aligned with a corresponding mounting hole 122 (FIG. 3) defined by the circuit board 100. In some embodiments, the frame 210 of the lens assembly 200 may include a plurality of alignment pins. In addition, the circuit board 120 may include a plurality of slots or holes configured to receive a corresponding alignment pin of the plurality of alignment pins. In this manner, the position (e.g., vertical, horizontal) of the lens assembly 200 relative to the circuit board 120 may be controlled such that the plurality of lenses 260 of the lens assembly 200 are more accurately aligned with a corresponding LED light source of the plurality of LED light sources on the circuit board 120. As will be discussed below in more detail, the lens assembly 200 can, in some embodiments, be coupled to the circuit board 120 via a plurality of fasteners 256.

In some embodiments, each of the plurality of fasteners 256 may extend through the mounting hole 252 (FIG. 5) defined by a corresponding mounting flange 250 (FIG. 4) of the frame 210. Each of the plurality of fasteners 256 may further extend through a corresponding mounting hole of the plurality of mounting holes 122 defined by the circuit board 120. In some embodiments, each of the plurality of fasteners 256 may further extend through a corresponding mounting hole of the plurality of mounting holes 114 defined by the surface 112 of the housing 110 (FIG. 2). In this manner, each of the plurality of fasteners 256 used to couple the lens assembly 200 to the circuit board 120 may extend through the surface 112 on which the circuit board 120 is positioned.

It should be appreciated that the lens assembly 200 may be coupled to the circuit board 120 in any suitable manner. For instance, in some embodiments, the lens assembly 200 is coupled to the circuit board 120 using rivets or snap-fits. In some embodiments, the lens assembly 200 is coupled to the circuit board 120 using an adhesive material or heat stakes. In other embodiments, washers (e.g., spring, Belleville, etc.) may be used in conjunction with the fasteners 256 to couple the lens assembly 200 to the circuit board 120. The washers and fasteners 256 may collectively provide a more constant force on the lens assembly 200 compared to embodiments in which the lens assembly 200 were coupled to the circuit board 120 using only the fastener 256 (e.g., screw, bolt).

When the lens assembly 200 is coupled to the circuit board 120, the plurality of lenses 260 may be positioned over the circuit board 120 such that each of the plurality of lenses 260 is in optical communication with a corresponding LED light source of the plurality of LED light sources 124 on the circuit board 120. In this manner, each of the plurality of lenses 260 may be configured to diffuse light emitted from the corresponding light source. In some embodiments, each of the plurality of lenses 260 may, as shown, be spaced apart from the circuit board 120.

Furthermore, in some embodiments, the gasket 270 may seal against the surface 112 to provide a seal between the circuit board 120 and an external environment surrounding the lighting fixture 100. In this manner, the plurality of LED devices 124 may be shielded from the external environment. For example, if the lighting fixture 100 (FIG. 1) is an outdoor lighting fixture, the seal protects the circuit board 120 and the plurality of LED devices 124 arranged thereon from moisture damage and insects. In alternative embodiments, the gasket 270 may seal against a surface of the circuit board 120 to provide a seal between the circuit board 120 and the external environment surrounding the lighting fixture 100.

In some embodiments, a portion of the gasket 270 may extend through the surface 112 of the housing 110 (FIG. 2) when the lens assembly 200 is coupled to the circuit board 120. For instance, the surface 112 may define an opening (not shown) through which the portion of the gasket 270 may extend therethrough. In this manner, the gasket 270 may be secured to the surface 112.

In alternative embodiments, the gasket 270 may bend such that the outer surface 274 of the gasket 270 may contact the surface 112 of the housing 110. More specifically, the gasket 270 may bend towards the inner portion of the frame 210 to allow the outer surface 274 of the gasket 270 to contact the surface 112. Alternatively, the gasket 270 may bend such that the inner surface 272 of the gasket 270 may contact the surface 112. More specifically, the gasket 270 may bend away from the inner portion of the frame 210 to allow the inner surface 272 of the gasket 270 to contact the surface 112.

Thus, embodiments described herein provide, among other things, one or more circuit boards, one or more light emitting diodes, and one or more lens assemblies. Various features and advantages are set forth in the following claims.

What is claimed is:

1. A circuit board coupleable to a lens assembly of a lighting fixture, the circuit board comprising:
   a plurality of light emitting diode (LED) light sources; and
   a plurality of mounting holes defined within;
   wherein when the circuit board is coupled to the lens assembly via a plurality of fasteners, each of the plurality of fasteners extends through a respective mounting hole of the plurality of mounting holes into a respective mounting flange of a plurality of mounting flanges defined by a frame of the lens assembly.

2. The circuit board of claim 1, wherein the frame of the lens assembly defines a plurality of openings and the lens assembly includes a plurality of lenses molded to the frame such that each of the plurality of lenses is at least partially positioned within a corresponding opening of the plurality of openings defined by the frame.

3. The circuit board of claim 2, wherein when the circuit board is coupled to the lens assembly, each of the plurality of lenses is in optical communication with a corresponding LED light source of the plurality of LED light sources.

4. The circuit board of claim 1, wherein the circuit board is a metal clad circuit board.

5. The circuit board of claim 1, wherein a gasket is molded to the bottom surface of the frame and the gasket provides a seal between the circuit board and an external environment when the circuit board is coupled to the lens assembly.

\* \* \* \* \*